(12) United States Patent
Zhang et al.

(10) Patent No.: US 12,394,306 B2
(45) Date of Patent: Aug. 19, 2025

(54) VEHICLE GUIDANCE METHOD, APPARATUS, AND SYSTEM FOR FREEWAY

(71) Applicant: Catarc Automotive Test Center (Guangzhou) Co., Ltd, Guangdong (CN)

(72) Inventors: Ziwen Zhang, Guangdong (CN); Bingbing Ma, Guangdong (CN); Xu Wang, Guangdong (CN); Liqiang Zeng, Guangdong (CN); Su Zhou, Guangdong (CN); Dejie Deng, Guangdong (CN); Junwen Liu, Guangdong (CN)

(73) Assignee: Catarc Automotive Test Center (Guangzhou) Co., Ltd, Guangzhou (CN)

( * ) Notice: Subject to any disclaimer, the term of this patent is extended or adjusted under 35 U.S.C. 154(b) by 388 days.

(21) Appl. No.: 18/057,764

(22) Filed: Nov. 22, 2022

(65) Prior Publication Data
US 2023/0326334 A1    Oct. 12, 2023

(30) Foreign Application Priority Data
Apr. 8, 2022    (CN) .......................... 202210364633.5

(51) Int. Cl.
G08G 1/052    (2006.01)
G08G 1/01    (2006.01)
G08G 1/0962    (2006.01)

(52) U.S. Cl.
CPC ........... G08G 1/052 (2013.01); G08G 1/0141 (2013.01); G08G 1/0145 (2013.01); G08G 1/0962 (2013.01)

(58) Field of Classification Search
CPC .... G08G 1/052; G08G 1/0141; G08G 1/0145; G08G 1/0962; G08G 1/08; Y02T 10/40
See application file for complete search history.

(56) References Cited

U.S. PATENT DOCUMENTS

2023/0036864 A1*  2/2023  Wu .................... G08G 1/052
2023/0368675 A1* 11/2023  Gardner ............. G08G 1/0145

* cited by examiner

Primary Examiner — Joseph H Feild
Assistant Examiner — Sharmin Akhter

(57) ABSTRACT

Disclosed are a vehicle guidance method, apparatus, and system for a freeway. The method includes: responsive to a detection a driving speed of a vehicle in a monitored road section is less than a preset proportion of an average driving speed of the monitored road section, determining the vehicle that the driving speed thereof is less than the preset proportion of the average driving speed as an abnormal vehicle, and determining a lane in which the abnormal vehicle is located as an abnormal lane; determining, according to an average driving speed and a traffic density of each lane in the monitored road section, whether there is a congestion risk; responsive to a determination that there is the congestion risk, obtaining a respective guidance scheme of each vehicle in each lane; and sending the respective guidance scheme to each vehicle.

15 Claims, 3 Drawing Sheets

VEHICLE GUIDANCE METHOD, APPARATUS, AND SYSTEM FOR FREEWAY

CROSS REFERENCE TO RELATED APPLICATIONS

The present application claims the benefit of Chinese Patent Application No. 202210364633.5 filed on Apr. 8, 2022, the contents of which are incorporated herein by reference in their entirety.

TECHNICAL FIELD

The present disclosure relates to the field of intelligent transportation technologies, and in particular, to a vehicle guidance method, an apparatus, and a system for a freeway.

BACKGROUND

Congestion on a freeway is always a problem that bothers travelers and traffic managers. Currently, a conventional method for eliminating a congestion risk on a freeway is mainly a variable speed limit (VSL) method used at a macro level. In this method, a running status of a vehicle in road traffic is automatically detected, a reasonable speed limit value in a current road is obtained through numerical calculation for a change of the running status of the vehicle on a road, and the calculated speed limit value is sent to each vehicle on the detected road. The speed limit of the vehicle is reasonably changed on different road sections at different times, such that congestion on the road is eliminated, thereby reducing a congestion risk on a freeway.

At present, the variable speed limit method is not perfectly used in the reality, and a calculation method for a reasonable speed limit value is often controversial. A speed limit policy obtained by some calculation methods may even lead to an increase in an accident risk. Therefore, simulation training needs to be performed in a simulation model in the calculation method. The simulation model is often different from an actual situation. As a result, the prior art is not practical, and a congestion risk on a freeway cannot be effectively estimated and reduced.

SUMMARY

The present disclosure provides a vehicle guidance method, an apparatus, and a system for a freeway, so as to effectively predict a congestion risk on a freeway and reduce or eliminate the congestion risk on the freeway by guiding vehicles.

According to a first aspect, the present application provides a vehicle guidance method for a freeway, including:
  responsive to a detection a driving speed of a vehicle in a monitored road section is less than a preset proportion of an average driving speed of vehicles in the monitored road section, determining the vehicle that the driving speed thereof is less than the preset proportion of the average driving speed as an abnormal vehicle, and determining a lane in which the abnormal vehicle is located as an abnormal lane;
  determining, according to an average driving speed and a traffic density of each lane in the monitored road section, whether there is a congestion risk;
  responsive to a determination that there is the congestion risk, obtaining, according to the traffic density of each lane, a respective guidance scheme of each vehicle in each lane within a preset distance behind the abnormal vehicle; and
  sending the respective guidance scheme to each vehicle within the preset distance, such that non-abnormal vehicles in the abnormal lane within the preset distance behind the abnormal vehicle change the lane thereof to an adjacent lane of the abnormal lane, and vehicles in each non-abnormal lane drive according to the respective guidance schemes, thus enabling a traffic density of each non-abnormal lane in the monitored road section to meet a preset requirement.

In this way, if a road is congested, an average vehicle speed decreases, and a traffic density increases, thereby reducing a driving spacing. Therefore, it is highly accurate to estimate a congestion risk of the monitored road section by using the average driving speed and the traffic density of the monitored road section. Responsive to a determination that there is the congestion risk, the non-abnormal vehicle in the abnormal lane is guided to change the lane thereof to another lane in a timely manner, and the respective guidance scheme is sent to each non-abnormal vehicle, such that traffic densities of lanes other than the abnormal lane in the monitored road section are rapidly equal, and impact of the abnormal vehicle on the monitored road section is eliminated. Compared with the variable speed limiting method in the prior art, in the technical solution of the present disclosure, not only a road congestion risk can be predicted, but also the guidance scheme of the non-abnormal vehicle can be calculated in a timely manner after a risk occurs. By planning a driving scheme of each non-abnormal vehicle, the vehicle is guided is drive, so as to rapidly and accurately resolve a vehicle congestion problem on a freeway.

Further, the determining, according to an average driving speed and a traffic density of each lane in the monitored road section, whether there is a congestion risk is specifically:
  obtaining, by using the traffic density of each lane in the monitored road section, an average driving spacing of the adjacent lane after the non-abnormal vehicles in the abnormal lane change the lane thereof to the adjacent lane; comparing and estimating the average driving spacing, changed after the non-abnormal vehicles in the abnormal lane change the lane thereof to the adjacent lane, and a safe driving spacing of the monitored road section; and
  if the average driving spacing is less than or equal to the safe driving spacing, determining that there is a congestion risk in the monitored road section; otherwise, determining that there is no congestion risk in the monitored road section.

In this way, the average driving speed and the traffic density of each lane are converted into the more intuitive average driving spacing, and the average driving spacing is compared with the safe driving spacing, thereby improving determining efficiency while ensuring accuracy.

Further, the obtaining, by using the traffic density of each lane in the monitored road section, an average driving spacing of the adjacent lane after the vehicles in the abnormal lane change the lane thereof to the adjacent lane is specifically: obtaining the average driving spacing according to the following formulas:

$$\begin{cases} \rho_{after} = \rho_{before} + A \cdot \rho_0 \\ \dfrac{D_{after}}{D_{before}} = \dfrac{\rho_{before}}{\rho_{after}} \end{cases},$$

where $D_{after}$ is the average driving spacing of the adjacent lane after the vehicles in the abnormal lane change the lane thereof to the adjacent lane; $\rho_{before}$ is a traffic density of the adjacent lane before the non-abnormal vehicles in the abnormal lane change the lane thereof to the adjacent lane; $\rho_0$ is a traffic density of the abnormal lane; $D_{before}$ is an average driving spacing of the adjacent lane before the non-abnormal vehicles in the abnormal lane change the lane thereof to the adjacent lane; A is a coefficient of traffic density diversion, and A is a constant; and $\rho_{after}$ is a final traffic density of the adjacent lane after the non-abnormal vehicles in the abnormal lane change the lane thereof to the adjacent lane.

Further, that non-abnormal vehicles in the abnormal lane change the lane thereof to an adjacent lane of the abnormal lane is: calculating, according to a number of left lanes and a number of right lanes of the abnormal lane and a traffic density of each left lane and a traffic density of each right lane of the abnormal lane, a number of the non-abnormal vehicles that change the lane thereof to a left adjacent lane and a number of the non-abnormal vehicles that change the lane thereof to a right adjacent lane within the preset distance behind the abnormal vehicle in the abnormal lane; obtaining, according to the number of the non-abnormal vehicles that change the lane thereof to the left adjacent lane and the number of the non-abnormal vehicles that change the lane thereof to the right adjacent lane in the abnormal lane, a guidance scheme of each non-abnormal vehicle within the preset distance behind the abnormal vehicle in the abnormal lane; and sending the guidance scheme to the non-abnormal vehicle within the preset distance in the abnormal lane, to guide the non-abnormal vehicle in the abnormal lane to change the lane thereof to an adjacent lane of the abnormal lane, where if both a vehicle that needs to change the lane thereof to a left adjacent lane and a vehicle that needs to change the lane thereof to a right adjacent lane existed in the non-abnormal vehicles in the abnormal lane, it is determined that two consecutive non-abnormal vehicles in the abnormal lane change the lane thereof to adjacent lanes on different sides.

In this way, a vehicle behind the abnormal vehicle in the abnormal lane is guided to change the lane thereof, thereby rapidly reducing impact of the abnormal vehicle on a road. In comparison with the prior art, in the present disclosure, vehicles in a same lane behind the abnormal vehicle can be accurately guided, so as to rapidly reduce a traffic density of the abnormal lane, reduce impact of the abnormal vehicle on road congestion, and alleviate a vehicle congestion problem on a freeway.

obtaining, according to the following formulas, the number $m_{lcross}$ of vehicles that need to change the lane thereof to the left lane and the number $m_{rcross}$ of vehicles that need to change the lane thereof to the right lane:

$$\begin{cases} \rho_t = \rho_{lt} + \rho_{rt} + \rho_0 \\ m_{lcross} = L \cdot \left( \frac{\rho_t}{n_l + n_r} - \frac{\rho_{lt}}{n_l} \right) \cdot n_l \\ m_{rcross} = L \cdot \left( \frac{\rho_t}{n_l + n_r} - \frac{\rho_{rt}}{n_r} \right) \cdot n_r \end{cases},$$

where

L is the preset distance behind the abnormal vehicle in the abnormal lane, $\rho_0$ is a traffic density of the abnormal lane, $\rho_{lt}$ is a total traffic density of the left lanes of the abnormal lane before the non-abnormal vehicles in the abnormal lane change the lane thereof, $n_l$ is the number of left lanes, $\rho_{rt}$ is a total traffic density of the right lanes, $n_r$ is the number of right lanes, and $\rho_t$ is a total traffic density of all lanes in the monitored road section.

Further, the calculating a respective guidance scheme of each vehicle in each non-abnormal lane is specifically:

obtaining, by using the traffic density of each lane, a number $m_{cross}$ of vehicles that need to change the lane thereof within the preset distance in each non-abnormal lane behind the abnormal vehicle;

sorting vehicles in a same lane in the non-abnormal lanes in ascending order according to a driving spacing between each vehicle in each non-abnormal lane within the preset distance behind the abnormal vehicle and front and rear vehicles, selecting first $m_{cross}$ vehicles as vehicles that are to perform lane change, and then determining a guidance direction of each vehicle in each non-abnormal lane within the preset distance, where unselected vehicles in the same lane are vehicles that are to keep driving;

determining a respective guidance scheme of each vehicle within the preset distance according to the guidance direction of each vehicle in each non-abnormal lane within the preset distance behind the abnormal vehicle, where the guidance scheme includes a lane change scheme and a keep driving scheme; and sending respective guidance schemes to all non-abnormal vehicles within the preset distance behind the abnormal vehicle, such that a vehicle that receives a lane change scheme performs lane change according to the lane change scheme, and a vehicle that receives a keep driving scheme keeps driving in a current lane.

The selecting first $m_{cross}$ vehicles as vehicles that are to perform lane change, and then determining a guidance direction of each vehicle in each non-abnormal lane is specifically:

determining, according to a traffic density of a lane in which a vehicle that is to perform lane change is located before the lane change and traffic densities of other lanes, a guidance direction of the vehicle that is to perform lane change, where the lane in which the vehicle that is to perform lane change is located before the lane change is determined a first lane, and a lane in which the vehicle that is to perform lane change is located after the lane change is a second lane; the second lane is a lane that the traffic density thereof is less than a traffic density of the first lane and closest to the first lane; and the guidance direction of the vehicle that is to perform lane change is a direction from the first lane to the second lane, and a guidance direction of the vehicle that keeps driving is to keep going straight.

In this way, the guidance direction of each non-abnormal vehicle is obtained through calculation, such that the guidance scheme of each vehicle is obtained, and each vehicle drives according to the respective guidance scheme. In this way, an accurate vehicle guidance strategy is achieved, to resolve a congestion risk on a freeway.

The obtaining, through calculation by using the traffic density, a number of vehicles that need to change the lane thereof in each lane is specifically:

obtaining, according to the following formula, the number $m_{cross}$ of vehicles that need to change the lane thereof:

$$m_{cross} = L \cdot \left( \frac{\rho_t}{n-1} - \rho_s \right),$$

where

L is the preset distance behind the abnormal vehicle in the abnormal lane, n is a total number of lanes, $\rho_s$ is a current traffic density of a lane that needs to be changed, and $\rho_t$ is a total traffic density of all lanes.

In this way, the number of vehicles that need to change the lane thereof is obtained through calculation, and the traffic density of each lane is balanced. Clear guidance is given to a vehicle through a guidance scheme, such that this method is practical and can be used to conveniently predict and resolve a congestion risk on a freeway.

According to a second aspect, the present application provides a vehicle guidance apparatus for a freeway, including an abnormal vehicle identification module, a prediction module, a calculation module, and a data transmission module, where specifically:

the abnormal vehicle identification module is configured to identify an abnormal vehicle, and responsive to a detection a driving speed of a vehicle in a monitored road section is less than an average driving speed of the monitored road section, determine the vehicle as the abnormal vehicle, and determine a lane in which the abnormal vehicle is located as an abnormal lane;

the prediction module is configured to determine, according to an average driving speed and a traffic density of each lane in the monitored road section, whether there is a congestion risk;

the calculation module is configured to calculate, according to the traffic density of each lane, a respective guidance scheme of each vehicle in each lane within a preset distance behind the abnormal vehicle; and the data transmission module is configured to send the guidance scheme to each vehicle according to a current driving lane of each vehicle, such that non-abnormal vehicles in the abnormal lane change the lane thereof to an adjacent lane of the abnormal lane, and each non-abnormal vehicle drives according to a respective guidance scheme, such that a gap between traffic densities of the non-abnormal lanes in the monitored road section is narrowed.

According to a third aspect, the present application further provides a vehicle guidance system for a freeway, including a server, multiple drive test devices, and multiple in-vehicle devices, where the server performs the vehicle guidance method for a freeway in any one of the first aspect.

The multiple drive test devices are configured to obtain an average speed of vehicles and a real-time driving speed of each vehicle in the monitored road section, and send the obtained data to the server; and the multiple in-vehicle devices are configured to receive a guidance scheme obtained through calculation in the server.

DETAILED DESCRIPTION

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Embodiment 1

Figure 1:
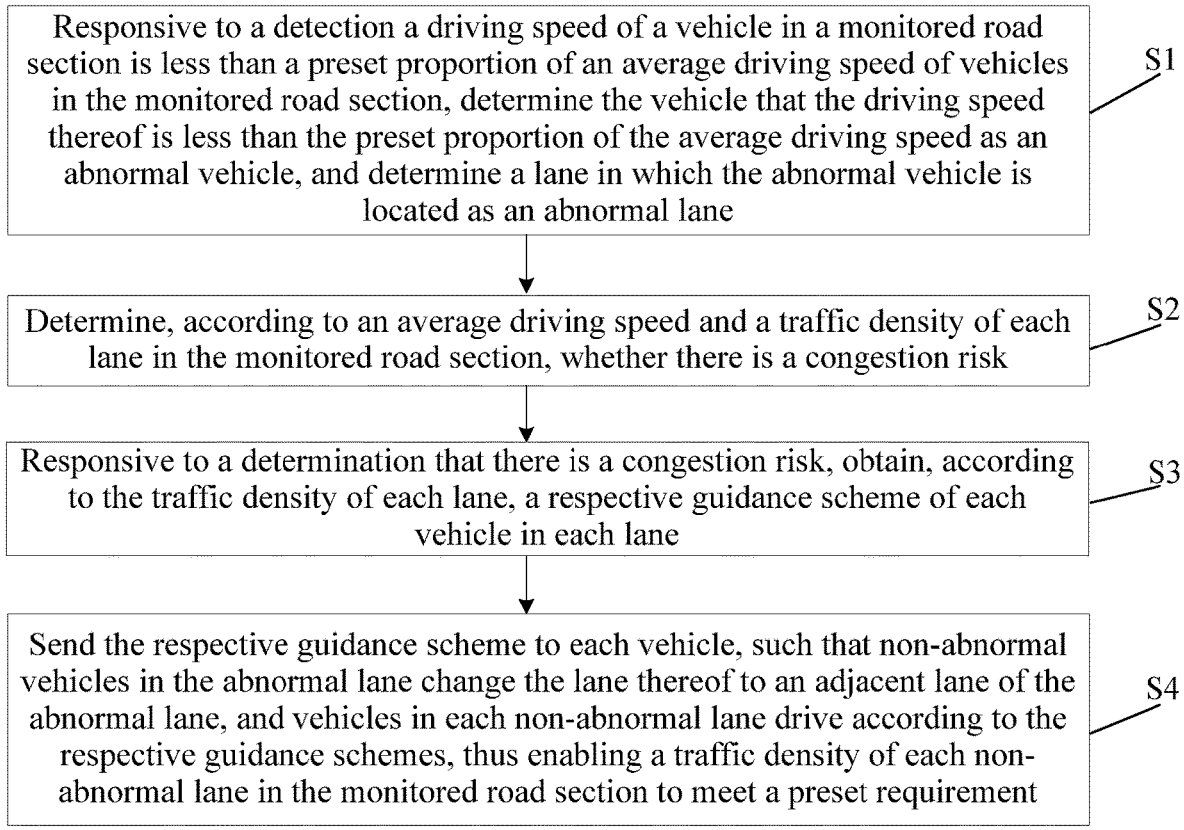
FIG. 1 is a schematic flowchart of an embodiment of a vehicle guidance method for a freeway according to the present disclosure.

Referring to FIG. 1, FIG. 1 is a schematic flowchart of a vehicle guide method for coping with a congestion risk on a freeway according to an embodiment of the present disclosure. The method includes steps S1 to S4, which are specifically as follows:

Step S1: Responsive to a detection a driving speed of a vehicle in a monitored road section is less than a preset proportion of an average driving speed of vehicles in the monitored road section, determine the vehicle that the driving speed thereof is less than the preset proportion of the average driving speed as an abnormal vehicle, and determine a lane in which the abnormal vehicle is located as an abnormal lane.

In this embodiment, a device for obtaining vehicle information in the monitored road section is a common drive test device, including a camera, an ultrasonic radar, a millimeter wave radar, a laser radar, a geomagnetic sensor, a vehicle-to-road coordination function of a roadside unit RSU, and the like. The drive test device is configured to obtain an average speed of vehicles and a real-time driving speed of each vehicle in the monitored road section.

In a preferred solution, responsive to a detection the driving speed of the vehicle is less than the preset proportion of the average driving speed in the monitored road section is specifically: responsive to the drive test device detects that the driving speed of the vehicle is less than 50% of the average driving speed in the monitored road section, the abnormal vehicle is determined and step S2 is performed.

In this way, a standard for determining the abnormal vehicle is improved, a condition for determining whether the road segment is congested is improved, a number of determining times can be reduced, and efficiency and accuracy of predicting a road congestion risk are increased.

Step S2: Determine, according to an average driving speed and a traffic density of each lane in the monitored road section, whether there is a congestion risk.

A specific determining criterion is as follows: An average driving spacing of the adjacent lane after the vehicles in the abnormal lane change the lane thereof to the adjacent lane is estimated by using the traffic density of each lane and an average driving spacing of each lane;

the average driving spacing, changed after the non-abnormal vehicles in the abnormal lane change the lane thereof to the adjacent lane, and a safe driving spacing of the monitored road section are compared and estimated, where the safe driving spacing on a freeway is specified by relevant departments of various countries; and if the average driving spacing is less than or equal to the safe driving spacing, it is determined that there is a congestion risk in the monitored road section; otherwise, it is determined that there is no congestion risk in the monitored road section.

If there is a congestion risk, step S3 is performed; otherwise, step S1 is performed again.

A manner of calculating the traffic density ρ is:
obtaining the traffic density p of each lane according to $$\rho = \frac{q}{V_{average}},$$

that is $$\rho = \frac{q}{V_{average}}.$$

Vehicle traffic q of each lane is a number of vehicles of each lane in the monitored road section per second, and $V_{average}$ is an average speed of vehicles in each lane.

A unit of the vehicle traffic q is: the number of vehicles/s, a unit of the average driving speed $V_{average}$ is km/h, and a unit of the traffic density is vehicles/km.

A method for specifically estimating the average driving spacing $D_{after}$ of the adjacent lane after the vehicles in the abnormal lane change the lane thereof to the adjacent lane is:
a formula for estimating a change in a traffic condition in the adjacent lane of the abnormal lane is:

$$\begin{cases} \rho_{after} = \rho_{before} + A \cdot \rho_0 \\ \frac{D_{after}}{D_{before}} = \frac{\rho_{before}}{\rho_{after}} \end{cases},$$

where

A final value $D_{after}$ of the average driving spacing of the adjacent lane after the non-abnormal vehicles in the abnormal lane change the lane thereof to the adjacent lane is obtained.

$\rho_{before}$ is a traffic density of the adjacent lane before the non-abnormal vehicles in the abnormal lane change the lane thereof to the adjacent lane, and $\rho_0$ is a traffic density of the abnormal lane.

The average driving spacing D of each lane is obtained by averaging a sum of product values of time intervals of vehicles crossing the drive test device within 30 s and a driving speed of a front vehicle in each interval, and a unit is meters. $D_{before}$ is an average driving spacing of the adjacent lane before the non-abnormal vehicles in the abnormal lane change the lane thereof to the adjacent lane.

A is a coefficient of traffic density diversion and is a constant. If the abnormal lane is the rightmost lane or the leftmost lane, A=1; or if the abnormal lane is the middle lane, A=0.5.

$\rho_{after}$ is a final traffic density of the adjacent lane after the non-abnormal vehicles in the abnormal lane change the lane thereof to the adjacent lane.

Step S3: Responsive to a determination that there is a congestion risk, obtain, according to the traffic density of each lane, a respective guidance scheme of each vehicle in each lane.

In this embodiment, an alarm in the monitored road section further gives an alert to vehicles in all lanes within subsequent 3 km behind the abnormal vehicle in the monitored road section, and sends, to vehicles in the adjacent lane of the abnormal lane, information about not changing the lane to the abnormal lane.

In this way, a vehicle in the non-abnormal lane can be prevented from changing the lane to the abnormal lane, and a lane change function of a vehicle in the abnormal lane can be ensured, to prevent repeated lane change of the vehicle.

Further, a number of the non-abnormal vehicles that change the lane thereof to a left adjacent lane and a number of the non-abnormal vehicles that change the lane thereof to a right adjacent lane within 3 km behind the abnormal vehicle in the abnormal lane are calculated according to a number of left lanes and a number of right lanes of the abnormal lane and a traffic density of each left lane and a traffic density of each right lane of the abnormal lane.

A formula for determining the number $m_{lcross}$ of non-abnormal vehicles that need to change the lane thereof to the left lane and the number $m_{rcross}$ of non-abnormal vehicles that need to change the lane thereof to the right lane in the abnormal lane is:

$$\begin{cases} \rho_t = \rho_{lt} + \rho_{rt} + \rho_0 \\ m_{lcross} = 3 \cdot \left( \frac{\rho_t}{n_l + n_r} - \frac{\rho_{lt}}{n_l} \right) \cdot n_l \\ m_{rcross} = 3 \cdot \left( \frac{\rho_t}{n_l + n_r} - \frac{\rho_{rt}}{n_r} \right) \cdot n_r \end{cases},$$

where
a total traffic density of the left lanes of the abnormal lane before the non-abnormal vehicles in the abnormal lane change the lane thereof is represented as $\rho_{lt}$, the number of left lanes is represented as $n_l$, a total traffic density of the right lanes is represented as $\rho_{rt}$, the number of right lanes is represented as $n_r$, and a total traffic density of all lanes is represented as $\rho_t$.

Further, a guidance scheme of each non-abnormal vehicle in the abnormal lane is obtained according to the number of vehicles that change the lane thereof to the left adjacent lane and the number of vehicles that change the lane thereof to the right adjacent lane in the abnormal lane; and the guidance scheme is sent to the non-abnormal vehicle in the abnormal lane, to guide the non-abnormal vehicle in the abnormal lane to change the lane thereof to an adjacent lane of the abnormal lane.

If both a vehicle that needs to change the lane thereof to a left adjacent lane and a vehicle that needs to change the lane thereof to a right adjacent lane existed in the non-abnormal vehicles in the abnormal lane, it is determined that two consecutive non-abnormal vehicles in the abnormal lane change the lane thereof to adjacent lanes on different sides.

Guidance schemes of all vehicles in the non-abnormal lane are calculated while the guidance scheme of the non-abnormal vehicle in the abnormal lane is obtained.

A method for calculating the guidance schemes of all the vehicles in the non-abnormal lane is specifically:
The number $m_{cross}$ of vehicles that need to change the lane thereof in each non-abnormal lane is obtained according to $$m_{cross} = 3 \cdot \left( \frac{\rho_t}{n-1} - \rho_s \right).$$

Vehicles in a same lane in the non-abnormal lanes are sorted in ascending order according to a driving spacing between each vehicle within 3 km behind the abnormal vehicle in each non-abnormal lane and front and rear vehicles, first $m_{cross}$ vehicles are selected as vehicles that are to perform lane change, and then a guidance direction of each vehicle in each non-abnormal lane is determined, where unselected vehicles in the same lane are vehicles that are to keep driving. A respective guidance scheme of each vehicle is determined according to the guidance direction of each vehicle in each non-abnormal lane.

The guidance scheme includes a lane change scheme and a keep driving scheme.

The lane in which the vehicle that is to perform lane change is located before the lane change is determined a first lane, and a lane in which the vehicle that is to perform lane change is located after the lane change is a second lane. The second lane is a lane that the traffic density thereof is less than a traffic density of the first lane and closest to the first lane.

The guidance direction of the vehicle in the lane change scheme is a lane change from the first lane to the second lane, and a guidance direction of the vehicle in the keep driving scheme is to keep going straight.

Step S4: Send the respective guidance scheme to each vehicle, such that non-abnormal vehicles in the abnormal lane change the lane thereof to an adjacent lane of the abnormal lane, and vehicles in each non-abnormal lane drive according to the respective guidance schemes, thus enabling a traffic density of each non-abnormal lane in the monitored road section to meet a preset requirement.

In this embodiment, guidance schemes are continuously provided, such that the vehicles change from a lane with a high traffic density to a lane with a low traffic density between adjacent lanes of the non-abnormal lane, and after traffic densities of all lanes except the abnormal lane meet the preset requirement and are equal, sending of the guidance scheme to the non-abnormal vehicles in the monitored road section is stopped.

The preset requirement is that the traffic densities of the non-abnormal lanes are equal, the traffic densities of the non-abnormal lanes tend to be equal, or a gap between the traffic densities of the non-abnormal lanes decreases, or the like.

In addition, a driver is alerted and guided in various forms such as a sound signal, an optical signal, a vibration signal, and a voice signal to ensure validity.

According to the vehicle guidance method for a freeway provided in this embodiment of the present disclosure, a vehicle that drives at a low speed is detected in a monitored road section, an abnormal vehicle and an abnormal lane are identified, and a congestion risk on a freeway is estimated according to a traffic density and an average driving spacing of each lane, to accurately predict the congestion risk on the freeway. Responsive to there is a risk, guidance schemes of all non-abnormal vehicles within 3 km behind the abnormal vehicle are calculated according to the traffic density and the average driving spacing of each lane, the non-abnormal vehicles in the abnormal lane within the preset distance behind the abnormal vehicle are enabled to change the lane thereof to an adjacent lane of the abnormal lane according to the guidance schemes, and the vehicles in each non-abnormal lane drive according to the respective guidance schemes. In addition, traffic densities of all lanes except the abnormal lane in the monitored road section are equal, thereby efficiently resolving a congestion risk on a freeway.

Embodiment 2

Figure 2:
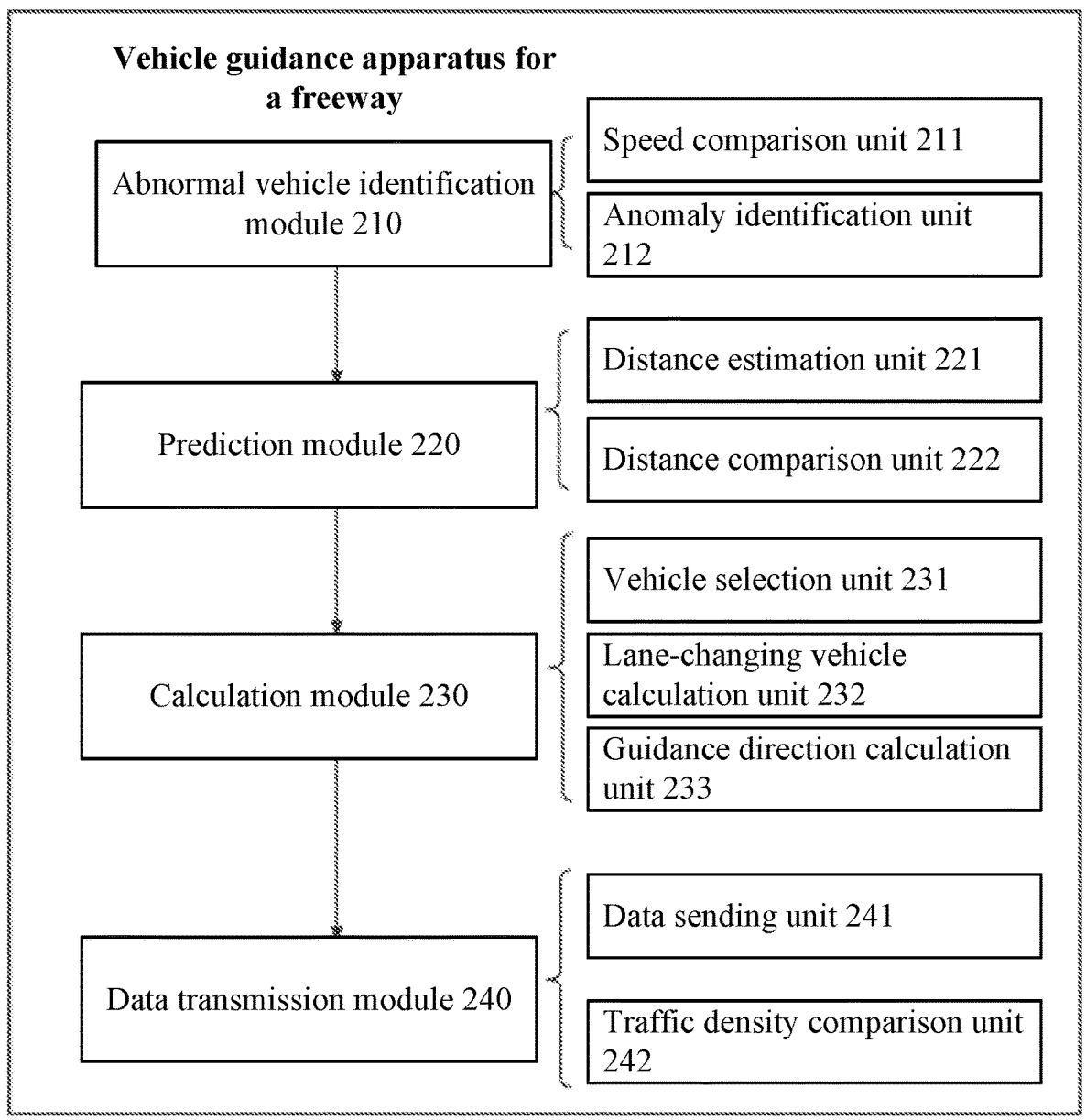
FIG. 2 is a structural module diagram of a vehicle guidance apparatus for a freeway according to an embodiment of the present disclosure.

Referring to FIG. 2, FIG. 2 is a structural module diagram of a vehicle guidance apparatus for a freeway according to an embodiment of the present disclosure.

The apparatus includes an abnormal vehicle identification module 210, a prediction module 220, a calculation module 230, and a data transmission module 240.

The abnormal vehicle identification module 210 is configured to identify an abnormal vehicle, and responsive to a detection a driving speed of a vehicle in a monitored road section is less than an average driving speed of the monitored road section, determine the vehicle as the abnormal vehicle, and determine a lane in which the abnormal vehicle is located as an abnormal lane.

The prediction module 220 is configured to determine, according to an average driving speed and a traffic density of each lane in the monitored road section, whether there is a congestion risk.

The calculation module 230 is configured to calculate, according to the traffic density of each lane, a respective guidance scheme of each vehicle in each lane within a preset distance behind the abnormal vehicle.

The data transmission module 240 is configured to send the guidance scheme to each vehicle according to a current driving lane of each vehicle, such that non-abnormal vehicles in the abnormal lane change the lane thereof to an adjacent lane of the abnormal lane, and each non-abnormal vehicle drives according to a respective guidance scheme, such that a traffic density of each non-abnormal lane in the monitored road section meets a preset requirement.

The abnormal vehicle identification module 210 includes a speed comparison unit 211 and an anomaly identification unit 212.

The speed comparison unit 211 is configured to compare the real-time driving speed of each vehicle in the monitored road section with a current average driving speed of the monitored road section.

The anomaly identification unit 212 is configured to identify a comparison result of the speed comparison unit 211. Responsive to the comparison result is that a driving speed of a vehicle is less than the average driving speed of the monitored road section, the anomaly identification unit 212 determines the vehicle as an abnormal vehicle, and also determines a lane in which the abnormal vehicle is located as an abnormal lane.

Further, the prediction module 220 further includes a distance estimation unit 221 and a distance comparison unit 222. Details are as follows:

The distance estimation unit 221 is configured to obtain, according to the average driving speed and the traffic density of each lane in the monitored road section, an average driving spacing of the adjacent lane after the non-abnormal vehicles in the abnormal lane change the lane thereof to the adjacent lane.

The distance comparison unit 222 is configured to compare the average driving spacing obtained from the distance estimation unit with a safe driving spacing, and if the average driving spacing is less than or equal to the safe driving spacing, determine that there is a congestion risk in the monitored road section; otherwise, determine that there is no congestion risk in the monitored road section.

Further, the calculation module 230 includes a vehicle selection unit 231, a lane-changing vehicle calculation unit 232, and a guidance direction calculation unit 233.

The vehicle selection unit 231 is configured to: responsive to the abnormal lane is not the leftmost or rightmost lane, select a non-abnormal vehicle behind the abnormal vehicle in the abnormal lane to change the lane thereof to a left or right lane.

The lane-changing vehicle calculation unit 232 is configured to calculate a number of vehicles that need to change the lane thereof in each non-abnormal lane within a predetermined distance behind the abnormal vehicle. Specifically, the number of vehicles that need to change the lane thereof in each non-abnormal lane is obtained according to the traffic density of each lane.

The guidance direction calculation unit 233 is configured to select a vehicle that is to perform lane change and a vehicle that is to keep driving according to the number that is of vehicles that need to change the lane thereof in each non-abnormal lane and that is obtained by the lane-changing vehicle calculation unit 232 and a driving spacing between each vehicle in each non-abnormal lane and front and rear vehicles, and obtain, according to the traffic density of each lane, a guidance direction of each vehicle that is to perform lane change.

Further, the data transmission module 240 includes a data sending unit 241 and a traffic density comparison unit 242.

The data sending unit 241 is configured to send the guidance scheme obtained by the calculation module 230 to the corresponding vehicle.

The traffic density comparison unit 242 is configured to compare the traffic density of each non-abnormal lane, and stop vehicle guidance responsive to the preset requirement is met.

In this way, the vehicle guidance apparatus for a freeway disclosed in this embodiment can completely implement all the steps of the vehicle guidance method for a freeway according to the present disclosure, to achieve the technical effect of Embodiment 1.

It can be understood that the foregoing apparatus embodiment corresponds to the method embodiment of the present disclosure, and can implement the vehicle guidance method for a freeway provided in the foregoing method embodiment of the present disclosure.

It should be noted that the described apparatus embodiment is merely an example. The modules described as separate parts may or may not be physically separate, and parts displayed as modules may be or may not be physical modules, may be located in one position, or may be distributed on a plurality of network units. Some or all the modules may be selected according to actual needs to achieve the objectives of the solutions of the embodiments. In addition, in the accompanying drawing of the apparatus embodiments provided by the present disclosure, connection relationships between modules indicate that the modules have communication connections with each other, which may be specifically implemented as one or more communications buses or signal cables. A person of ordinary skill in the art may understand and implement the embodiments of the present application without creative efforts. The schematic diagram is merely an example of the vehicle guidance apparatus for a freeway, and does not constitute a limitation on the vehicle guidance apparatus. The vehicle guidance apparatus may include more or fewer components than that shown in the figure, or may combine some components, or may have different components.

Embodiment 3

Figure 3:
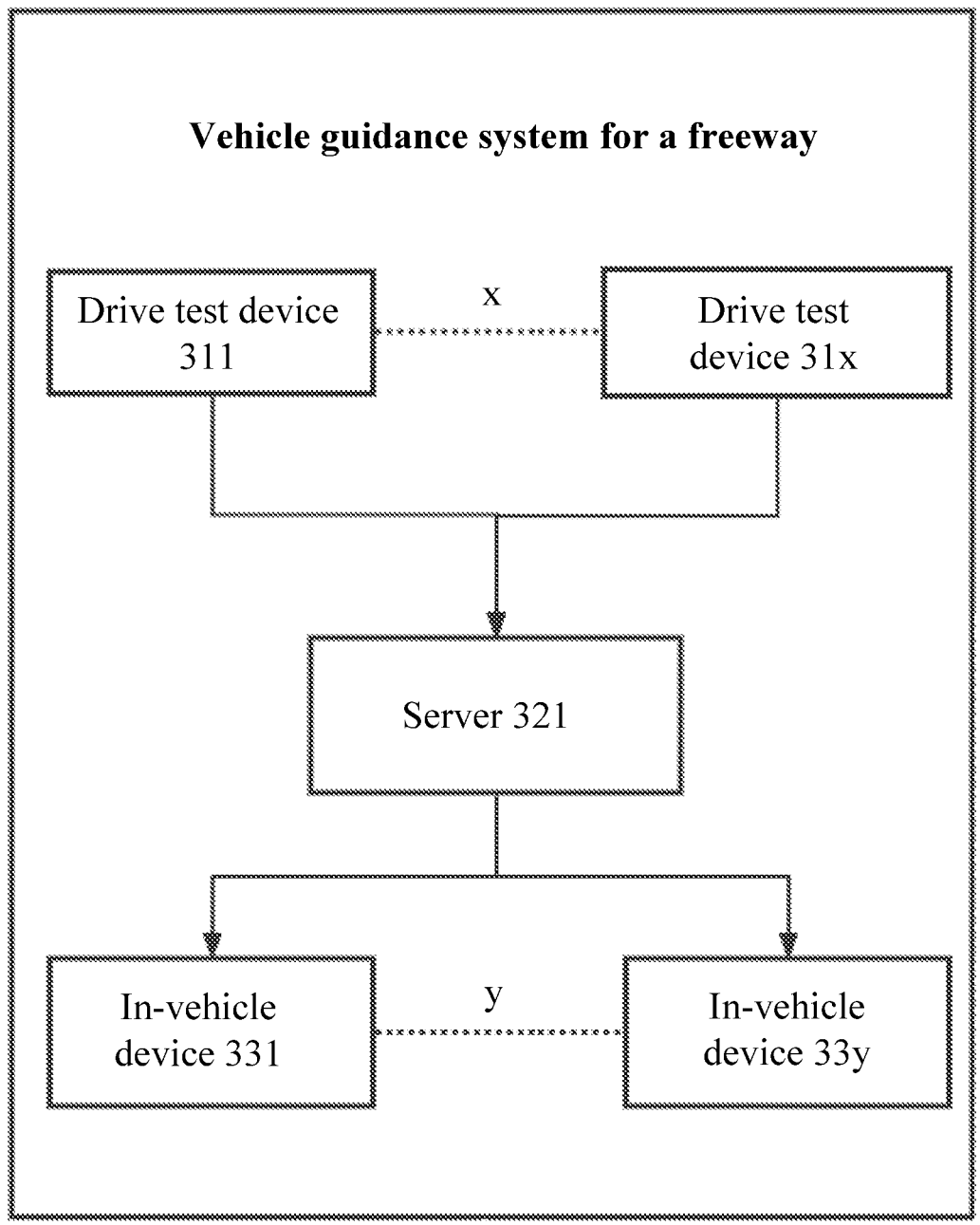
FIG. 3 is a structural block diagram of a vehicle guidance system for a freeway according to an embodiment of the present disclosure.

Referring to FIG. 3, FIG. 3 is a structural block diagram of a vehicle guidance system for a freeway according to an embodiment of the present disclosure.

The guidance system provided in this embodiment of the present disclosure includes a server 321, a drive test device 311 to a drive test device 31x, and an in-vehicle device 331 to an in-vehicle device 33y. The server can implement the vehicle guidance method for a freeway.

The server implements the steps in the foregoing embodiment of the vehicle guidance method for a freeway, for example, all the steps of the vehicle guidance method for a freeway shown in FIG. 1.

The drive test device 311 to the drive test device 31x monitor a monitored road section, obtain an average speed and a traffic density of vehicles in the monitored road section and a real-time driving speed of each vehicle, and transmit the obtained data to the server 321.

The in-vehicle device 331 to the in-vehicle device 33y are configured to obtain a respective guidance scheme of each vehicle obtained through calculation in the server 321.

In addition, the drive test device may include a camera, an ultrasonic radar, a millimeter wave radar, a laser radar, a geomagnetic sensor, a vehicle-to-road coordination function of a roadside unit RSU, and the like.

The vehicle guidance system for a freeway in this embodiment of the present disclosure corresponds to the method embodiment of the present disclosure, and may implement the vehicle guidance method for a freeway provided in the foregoing method embodiment of the present disclosure.

In the foregoing specific embodiments, the objectives, technical solutions, and beneficial effects of the present disclosure are further described in detail. It should be understood that the foregoing descriptions are merely specific embodiments of the present disclosure, but are not intended to limit the protection scope of the present disclosure. It should be specially noted that for a person skilled in the art, any modification, equivalent replacement, or improvement made without departing from the spirit and principle of the present disclosure shall fall within the protection scope of the present disclosure.

The invention claimed is:

1. A vehicle guidance method for a freeway, comprising:
responsive to a detection that a driving speed of a vehicle in a monitored road section is less than a preset proportion of an average driving speed of vehicles in the monitored road section, determining the vehicle that the driving speed thereof is less than the preset proportion of the average driving speed as an abnormal vehicle, and determining a lane in which the abnormal vehicle is located as an abnormal lane;
determining, according to an average driving speed and a traffic density of each lane in the monitored road section, whether there is a congestion risk;
responsive to a determination that there is the congestion risk, obtaining, according to the traffic density of each lane, a respective guidance scheme of each vehicle in each lane within a preset distance behind the abnormal vehicle; and
sending the respective guidance scheme to each vehicle within the preset distance, such that non-abnormal vehicles in the abnormal lane within the preset distance behind the abnormal vehicle change the lane thereof to an adjacent lane of the abnormal lane, and vehicles in each non-abnormal lane drive according to the respective guidance schemes, thus enabling a traffic density of each non-abnormal lane in the monitored road section to meet a preset requirement;
wherein the determining, according to an average driving speed and a traffic density of each lane in the monitored road section, whether there is a congestion risk is specifically:
obtaining, by using the traffic density of each lane in the monitored road section, an average driving spacing of the adjacent lane after the non-abnormal vehicles in the abnormal lane change the lane thereof to the adjacent lane;

comparing and estimating the average driving spacing, changed after the non-abnormal vehicles in the abnormal lane change the lane thereof to the adjacent lane, and a safe driving spacing of the monitored road section; and if the average driving spacing is less than or equal to the safe driving spacing, determining that there is a congestion risk in the monitored road section;

otherwise, determining that there is no congestion risk in the monitored road section.

2. The vehicle guidance method for a freeway according to claim 1, wherein the obtaining, by using the traffic density of each lane in the monitored road section, an average driving spacing of the adjacent lane after the vehicles in the abnormal lane change the lane thereof to the adjacent lane is specifically:

obtaining the average driving spacing $D_{after}$ according to following formulas:

$$\begin{cases} \rho_{after} = \rho_{before} + A \cdot \rho_0 \\ \dfrac{D_{after}}{D_{before}} = \dfrac{\rho_{before}}{\rho_{after}} \end{cases},$$

wherein $D_{after}$ is the average driving spacing of the adjacent lane after the vehicles in the abnormal lane change the lane thereof to the adjacent lane;

$P_{before}$ is a traffic density of the adjacent lane before the non-abnormal vehicles in the abnormal lane change the lane thereof to the adjacent lane;

$\rho_0$ is a traffic density of the abnormal lane;

$D_{before}$ is an average driving spacing of the adjacent lane before the non-abnormal vehicles in the abnormal lane change the lane thereof to the adjacent lane;

A is a coefficient of traffic density diversion, and A is a constant; and $\rho_{after}$ is a final traffic density of the adjacent lane after the non-abnormal vehicles in the abnormal lane change the lane thereof to the adjacent lane.

3. The vehicle guidance method for a freeway according to claim 1, wherein that non-abnormal vehicles in the abnormal lane change the lane thereof to an adjacent lane of the abnormal lane is specifically:

calculating, according to a number of left lanes and a number of right lanes of the abnormal lane and a traffic density of each left lane and a traffic density of each right lane of the abnormal lane, a number of the non-abnormal vehicles that change the lane thereof to a left adjacent lane and a number of the non-abnormal vehicles that change the lane thereof to a right adjacent lane within the preset distance behind the abnormal vehicle in the abnormal lane;

obtaining, according to the number of the non-abnormal vehicles that change the lane thereof to the left adjacent lane and the number of the non-abnormal vehicles that change the lane thereof to the right adjacent lane in the abnormal lane, a guidance scheme of each non-abnormal vehicle within the preset distance behind the abnormal vehicle in the abnormal lane; and sending the guidance scheme of each non-abnormal vehicle to the non-abnormal vehicle within the preset distance in the abnormal lane, to guide the non-abnormal vehicle in the abnormal lane to change the lane thereof to an adjacent lane of the abnormal lane, wherein if both a vehicle that needs to change the lane thereof to a left adjacent lane and a vehicle that needs to change the lane thereof to a right adjacent lane existed in the non-abnormal vehicles within the preset distance behind the abnormal vehicle in the abnormal lane, it is determined that two consecutive non-abnormal vehicles in the abnormal lane change the lane thereof to adjacent lanes on different sides.

4. The vehicle guidance method for a freeway according to claim 3, wherein the calculating, according to a number of left lanes and a number of right lanes of the abnormal lane and a traffic density of each left lane and a traffic density of each right lane of the abnormal lane, a number of the non-abnormal vehicles that change the lane thereof to a left adjacent lane and a number of the non-abnormal vehicles that change the lane thereof to a right adjacent lane within the preset distance behind the abnormal vehicle in the abnormal lane is specifically:

obtaining, according to following formulas, the number $m_{lcross}$ of vehicles that need to change the lane thereof to the left lane and the number $m_{rcross}$ of vehicles that need to change the lane thereof to the right lane:

$$\begin{cases} \rho_t = \rho_{lt} + \rho_{rt} + \rho_0 \\ m_{lcross} = L \cdot \left( \dfrac{\rho_t}{n_l + n_r} - \dfrac{\rho_{lt}}{n_l} \right) \cdot n_l \\ m_{rcross} = L \cdot \left( \dfrac{\rho_t}{n_l + n_r} - \dfrac{\rho_{rt}}{n_r} \right) \cdot n_r \end{cases},$$

wherein

L is the preset distance behind the abnormal vehicle in the abnormal lane, $\rho_0$ is a traffic density of the abnormal lane, $\rho_{lt}$ is a total traffic density of the left lanes of the abnormal lane before the non-abnormal vehicles in the abnormal lane change the lane thereof, $n_l$ is the number of left lanes, $\rho_{rt}$ is a total traffic density of the right lanes, $n_r$ is the number of right lanes, and $\rho_t$ is a total traffic density of all lanes in the monitored road section.

5. The vehicle guidance method for a freeway according to claim 1, wherein that vehicles in each non-abnormal lane drive according to the respective guidance schemes is specifically:

obtaining, by using the traffic density of each lane, a number $m_{cross}$ of vehicles that need to change the lane thereof within the preset distance in each non-abnormal lane behind the abnormal vehicle;

sorting vehicles in a same lane in the non-abnormal lanes in ascending order according to a driving spacing between each vehicle in each non-abnormal lane within the preset distance behind the abnormal vehicle and front and rear vehicles, selecting first $m_{cross}$ vehicles as vehicles that are to perform lane change, and then determining a guidance direction of each vehicle in each non-abnormal lane within the preset distance, wherein unselected vehicles in the same lane are vehicles that are to keep driving;

determining a respective guidance scheme of each vehicle within the preset distance according to the guidance direction of each vehicle in each non-abnormal lane within the preset distance behind the abnormal vehicle, wherein the guidance scheme comprises a lane change scheme and a keep driving scheme; and sending respective guidance schemes to all non-abnormal vehicles within the preset distance behind the abnormal vehicle, such that a vehicle that receives a lane change scheme performs lane change according to the lane change scheme, and a vehicle that receives a keep driving scheme keeps driving in a current lane.

6. The vehicle guidance method for a freeway according to claim 5, wherein the selecting first $m_{cross}$ vehicles as vehicles that are to perform lane change, and then determining a guidance direction of each vehicle in each non-abnormal lane is specifically:

determining, according to a traffic density of a lane in which a vehicle that is to perform lane change before the lane change is located and traffic densities of other lanes, a guidance direction of the vehicle that is to perform lane change, wherein the lane in which the vehicle that is to perform lane change is located before the lane change is determined a first lane, and a lane in which the vehicle that is to perform lane change is located after the lane change is a second lane;

the second lane is a lane that the traffic density thereof is less than a traffic density of the first lane and closest to the first lane; and the guidance direction of the vehicle that is to perform lane change is a direction from the first lane to the second lane, and a guidance direction of the vehicle that keeps driving is to keep going straight.

7. The vehicle guidance method for a freeway according to claim 5, wherein the obtaining, by using the traffic density of each lane, a number $m_{cross}$ of vehicles that need to change the lane thereof in each non-abnormal lane is specifically:

obtaining, according to a following formula, the number $m_{cross}$ of vehicles that need to change the lane thereof:

$$m_{cross} = L \cdot \left( \frac{\rho_t}{n-1} - \rho_s \right),$$

wherein

L is the preset distance behind the abnormal vehicle in the abnormal lane, n is a total number of lanes, $\rho_s$ is a current traffic density of a lane that needs to be changed, and $\rho_t$ is a total traffic density of all lanes.

8. A vehicle guidance apparatus for a freeway, comprising an abnormal vehicle identification module, a prediction module, a calculation module, and a data transmission module, wherein specifically:

the abnormal vehicle identification module is configured to identify an abnormal vehicle, and responsive to a detection that a driving speed of a vehicle in a monitored road section is less than an average driving speed of the monitored road section, determine the vehicle as the abnormal vehicle, and determine a lane in which the abnormal vehicle is located as an abnormal lane;

the prediction module is configured to determine, according to an average driving speed and a traffic density of each lane in the monitored road section, whether there is a congestion risk;

the calculation module is configured to calculate, according to the traffic density of each lane, a respective guidance scheme of each vehicle in each lane within a preset distance behind the abnormal vehicle; and the data transmission module is configured to send the guidance scheme to each vehicle according to a current driving lane of each vehicle, such that non-abnormal vehicles in the abnormal lane change the lane thereof to an adjacent lane of the abnormal lane, and each non-abnormal vehicle drives according to a respective guidance scheme, such that a traffic density of each non-abnormal lane in the monitored road section meets a preset requirement;

wherein the prediction module is further configured to:

obtain, by using the traffic density of each lane in the monitored road section, an average driving spacing of the adjacent lane after the non-abnormal vehicles in the abnormal lane change the lane thereof to the adjacent lane;

compare and estimate the average driving spacing, changed after the non-abnormal vehicles in the abnormal lane change the lane thereof to the adjacent lane, and a safe driving spacing of the monitored road section; and if the average driving spacing is less than or equal to the safe driving spacing, determine that there is a congestion risk in the monitored road section;

otherwise, determine that there is no congestion risk in the monitored road section.

9. A vehicle guidance system for a freeway, comprising a server, multiple drive test devices, and multiple in-vehicle devices each of which comprises a memory and a processor, wherein the server performs the vehicle guidance method for a freeway according to claim 1;

the multiple drive test devices are configured to obtain an average speed of vehicles and a real-time driving speed of each vehicle in the monitored road section, and send the obtained data to the server; and the processors of the multiple in-vehicle devices are configured to receive a guidance scheme obtained through calculation in the server.

10. A vehicle guidance system for a freeway, comprising a server, multiple drive test devices, and multiple in-vehicle devices each of which comprises a processor and a memory, wherein the server performs the vehicle guidance method for a freeway according to claim 3;

the multiple drive test devices are configured to obtain an average speed of vehicles and a real-time driving speed of each vehicle in the monitored road section, and send the obtained data to the server; and the processors of the multiple in-vehicle devices are configured to receive a guidance scheme obtained through calculation in the server.

11. A vehicle guidance system for a freeway, comprising a server, multiple drive test devices, and multiple in-vehicle devices each of which comprises a processor and a memory, wherein the server performs the vehicle guidance method for a freeway according to claim 3;

the multiple drive test devices are configured to obtain an average speed of vehicles and a real-time driving speed of each vehicle in the monitored road section, and send the obtained data to the server; and the processors of the multiple in-vehicle devices are configured to receive a guidance scheme obtained through calculation in the server.

12. A vehicle guidance system for a freeway, comprising a server, multiple drive test devices, and multiple in-vehicle devices each of which comprises a processor and a memory, wherein the server performs the vehicle guidance method for a freeway according to claim 4;

the multiple drive test devices are configured to obtain an average speed of vehicles and a real-time driving speed of each vehicle in the monitored road section, and send the obtained data to the server; and the processors of the multiple in-vehicle devices are configured to receive a guidance scheme obtained through calculation in the server.

13. A vehicle guidance system for a freeway, comprising a server, multiple drive test devices, and multiple in-vehicle devices each of which comprises a processor and a memory, wherein the server performs the vehicle guidance method for a freeway according to claim 5;

the multiple drive test devices are configured to obtain an average speed of vehicles and a real-time driving speed of each vehicle in the monitored road section, and send the obtained data to the server; and the processors of the multiple in-vehicle devices are configured to receive a guidance scheme obtained through calculation in the server.

14. A vehicle guidance system for a freeway, comprising a server, multiple drive test devices, and multiple in-vehicle devices each of which comprises a processor and a memory, wherein the server performs the vehicle guidance method for a freeway according to claim 6;

the multiple drive test devices are configured to obtain an average speed of vehicles and a real-time driving speed of each vehicle in the monitored road section, and send the obtained data to the server; and the processors of the multiple in-vehicle devices are configured to receive a guidance scheme obtained through calculation in the server.

15. A vehicle guidance system for a freeway, comprising a server, multiple drive test devices, and multiple in-vehicle devices each of which comprises a processor and a memory, wherein the server performs the vehicle guidance method for a freeway according to claim 7;

the multiple drive test devices are configured to obtain an average speed of vehicles and a real-time driving speed of each vehicle in the monitored road section, and send the obtained data to the server; and the processors of the multiple in-vehicle devices are configured to receive a guidance scheme obtained through calculation in the server.

* * * * *